United States Patent
Narasimhan et al.

(10) Patent No.: US 6,237,145 B1
(45) Date of Patent: *May 22, 2001

(54) SYSTEM FOR ACCESSING PROMOTION INFORMATION AND FOR GENERATING REDEEMABLE COUPONS THEREFROM

(75) Inventors: Ashok Narasimhan; Vas Raman, both of Los Altos Hills, CA (US); Bernard David, Wilmington, DE (US)

(73) Assignee: InfoSpace, Inc., Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/696,705

(22) Filed: Aug. 14, 1996

Related U.S. Application Data

(63) Continuation-in-part of application No. 08/466,270, filed on Jun. 6, 1995, now abandoned.

(51) Int. Cl.[7] ................................................... H04N 7/173
(52) U.S. Cl. ............................. 725/23; 725/37; 725/105; 725/141; 705/14
(58) Field of Search ............................... 348/6, 7, 12, 10, 348/13, 460, 473, 552, 2, 553; 455/3.1, 5.1, 5.2, 6.2; 395/200.47, 200.48, 200.49; 235/381, 385; 186/52, 55, 56; 705/14

(56) References Cited

U.S. PATENT DOCUMENTS

| | | |
|---|---|---|
| Re. 34,915 | 4/1995 | Nichtberger et al. . |
| 4,554,446 | 11/1985 | Murphy et al. . |
| 4,674,041 | 6/1987 | Lemon et al. . |
| 4,703,423 | 10/1987 | Bado et al. . |
| 4,723,212 | 2/1988 | Mindrum et al. . |
| 4,745,468 | 5/1988 | Von Kohorn . |
| 4,825,045 | 4/1989 | Humble . |
| 4,833,308 | 5/1989 | Humble . |
| 4,839,505 | 6/1989 | Bradt et al. . |
| 4,876,592 | 10/1989 | Von Kohorn . |
| 4,882,675 | 11/1989 | Nichtberger et al. . |
| 4,896,791 | 1/1990 | Smith . |
| 4,908,761 | 3/1990 | Tai . |
| 4,910,672 | 3/1990 | Off et al. . |
| 4,941,090 | 7/1990 | McCarthy . |
| 4,949,256 | 8/1990 | Humble . |
| 4,974,878 | 12/1990 | Josephson . |
| 4,982,346 | 1/1991 | Girouard et al. . |
| 5,010,485 | 4/1991 | Bigari . |
| 5,034,807 | 7/1991 | Von Kohorn . |
| 5,053,955 | 10/1991 | Peach et al. . |
| 5,056,019 | 10/1991 | Schultz et al. . |
| 5,057,915 | 10/1991 | Von Kohorn . |
| 5,085,470 | 2/1992 | Peach et al. . |
| 5,095,195 | 3/1992 | Harman et al. . |
| 5,117,355 | 5/1992 | McCarthy . |
| 5,128,752 | 7/1992 | Von Kohorn . |

(List continued on next page.)

Primary Examiner—Chris Grant
(74) Attorney, Agent, or Firm—Christensen O'Connor Johnson Kindness PLLC; Anthony B. Claiborne

(57) ABSTRACT

A system for accessing and displaying promotion information and for generating redeemable coupons based on at least one of the accessed promotions stores promotion information records each of which includes an electronic coupon offer and information in connection with a product/service a merchant sells. The system also stores a user profile for a system user which includes user preference information. The stored records are presented according to a hierarchical menu structure. The user navigates menus to select promotion information records for presentation. The user electronically clips the coupon offer of the presented record and the electronic clipped coupon is stored. At the merchant, the electronic clipped coupon is accessed and reviewed, and a paper coupon corresponding to the electronic clipped coupon is selectively generated for redemption by the merchant.

7 Claims, 5 Drawing Sheets

U.S. PATENT DOCUMENTS

| | | |
|---|---|---|
| 5,135,782 | 8/1992 | Rostoker et al. . |
| 5,173,851 | 12/1992 | Off et al. . |
| 5,185,695 | 2/1993 | Pruchnicki . |
| 5,202,826 | 4/1993 | McCarthy . |
| 5,216,515 | 6/1993 | Steele et al. . |
| 5,227,874 | 7/1993 | Von Kohorn . |
| 5,237,157 | 8/1993 | Kaplan . |
| 5,249,044 | 9/1993 | Von Kohorn . |
| 5,256,863 | 10/1993 | Ferguson et al. . |
| 5,283,734 | 2/1994 | Von Kohorn . |
| 5,285,278 * | 2/1994 | Holman ............ 348/10 X |
| 5,287,181 | 2/1994 | Holman . |
| 5,287,268 | 2/1994 | McCarthy . |
| 5,293,310 | 3/1994 | Carroll et al. . |
| 5,305,195 | 4/1994 | Murphy . |
| 5,305,196 | 4/1994 | Deaton et al. . |
| 5,305,197 | 4/1994 | Axler et al. . |
| 5,309,355 | 5/1994 | Lockwood . |
| 5,319,455 | 6/1994 | Hoarty et al. . |
| 5,321,604 | 6/1994 | Peach et al. . |
| 5,327,508 | 7/1994 | Deaton et al. . |
| 5,346,654 | 9/1994 | Kodaka et al. . |
| 5,353,218 | 10/1994 | De Lapa et al. . |
| 5,353,219 | 10/1994 | Mueller et al. . |
| 5,368,129 | 11/1994 | Von Kohorn . |
| 5,380,991 | 1/1995 | Valencia et al. . |
| 5,436,830 | 7/1995 | Zaltman . |
| 5,438,356 | 8/1995 | Ushiki et al. . |
| 5,459,306 | 10/1995 | Stein et al. . |
| 5,467,269 | 11/1995 | Flaten . |
| 5,483,049 | 1/1996 | Schulze, Jr. . |
| 5,488,423 | 1/1996 | Walkingshaw et al. . |
| 5,500,681 | 3/1996 | Jones . |
| 5,502,636 | 3/1996 | Clarke . |
| 5,504,675 | 4/1996 | Cragun et al. . |
| 5,515,270 | 5/1996 | Weinblatt . |
| 5,594,493 * | 1/1997 | Nemirofsky ............ 348/13 |
| 5,642,279 | 6/1997 | Bloomberg et al. . |
| 5,710,886 * | 1/1998 | Christensen et al. ........ 705/14 X |
| 5,729,693 | 3/1998 | Holda-Fleck . |
| 5,761,648 * | 6/1998 | Golden et al. ............ 705/14 |
| 5,774,870 | 6/1998 | Storey ............ 705/14 |
| 5,794,210 | 8/1998 | Goldhaber et al. ............ 705/14 |
| 5,806,045 | 9/1998 | Biorge et al. . |
| 5,832,457 | 11/1998 | O'Brien et al. ............ 705/14 |

\* cited by examiner

SYSTEM FOR ACCESSING PROMOTION INFORMATION AND FOR GENERATING REDEEMABLE COUPONS THEREFROM

CROSS-REFERENCE TO RELATED APPLICATION

This is a continuation-in-part of U.S. patent application Ser. No. 08/466,270, filed Jun. 6, 1995, and entitled "Method and Apparatus for Viewing Promotional Information and for Generating Redeemable Coupons Therefrom", now abandoned.

FIELD OF THE INVENTION

The present invention relates to a system for accessing and displaying promotion information and for generating redeemable coupons therefrom. More particularly, the present invention relates to such a system where the accessing and generating for each particular user is influenced by a user profile for the user.

BACKGROUND OF THE INVENTION

Discount coupons and other similar "tokens" are conventionally offered by manufacturers and retailers in newspapers, in magazines, by direct mail, and the like to entice members of the public to buy a particular product or service. As is well known, such coupons are usually targeted to specific types of consumers, and such targeting may be performed in a highly sophisticated manner. Nevertheless, the fact remains that the redemption rate for coupons in many situations may be in the range of one to two percent. A major reason for such a low rate is that many coupons offered to a particular consumer are rejected by that consumer simply for lack of interest. Further, even if a consumer wishes to take advantage of a coupon offer, the consumer may be prevented from doing so based on the inability to redeem the coupon before the expiration date. As a result, ninety-eight percent or more of all offered coupons are never redeemed.

Systems have been proposed to increase the rate of redemption of coupons. For example, in one system, product information (i.e., listings, specifications, prices, discounts or other information for a product or service including depiction by language or graphics) is broadcast from a central location to a user's remote location, either as an over-the-air broadcast television signal or a cable television signal. In response to the transmitted product information, the user can print a redeemable coupon at a generating unit at the user's remote location based upon the transmitted information. While such system may increase the percentage of coupons redeemed, the system has a serious disadvantage in that the user must endure what is essentially an unending series of television commercials, many of which are for products and/or services of no interest to the user.

In an improvement to the aforementioned system, the transmitted product information from the central location is stored in a storage unit at the user's remote location. The user can then play back, rewind, and fast forward through the stored product information, and can print a redeemable coupon at a generating unit at the user's remote location based upon the stored information. The storage unit can be configured to store all transmitted product information or only the transmitted product information that meets pre-selected requirements (e.g., product information for food products only). However, the improved system shares the same disadvantage as the previous system in that a user must still sift through much product information of no interest to the user. Furthermore, both systems are impractical in that the cost of placing a coupon generating unit at each user's remote location is prohibitive.

A need exists, then, for a redeemable coupon generation system that allows a user to quickly access and peruse promotions or offers that are likely to be of interest to that user, that allows the user to generate one or more coupons to take advantage of at least one of the accessed promotions and offers, and that does not require additional equipment beyond that which is likely already available to the user.

SUMMARY OF THE INVENTION

The aforementioned need is satisfied by a system for accessing and displaying promotion information and for generating redeemable coupons based on at least one of the accessed promotions. The system has a promotion information record storage device for storing a plurality of promotion information records. Each promotion information record includes an electronic coupon offer in connection with a product or service a merchant sells and information relating to the product or service being promoted. The system also has a user profile storage device for storing a user profile for a system user. The user profile includes user preference information based on preferences of the user. The user has a unique system identifier.

A presentation device presents the stored promotion information records according to a hierarchical menu structure which includes a main menu and a plurality of hierarchically linked sub-menus. Each sub-menu includes a plurality of choices and the user navigates among the main menu and sub-menus to select promotion information records for presentation. An electronic coupon clipping device allows the user to electronically clip the coupon offer of the presented promotion information record. The electronic clipped coupon offer is stored in an electronic clipped coupon database in connection with the user profile for the user.

A paper coupon generating device is located at a merchant. With the paper coupon generating device, the unique system identifier of the user is entered, the electronic clipped coupon offer from the electronic clipped coupon database is accessed, the user reviews the electronic clipped coupon offer, and a paper coupon corresponding to the electronic clipped coupon offer may be selectively generated for the user. The paper coupon is then redeemable by the merchant.

BRIEF DESCRIPTION OF THE DRAWINGS

The foregoing summary, as well as the following detailed description of a preferred embodiment of the present invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENT

Figure 1:
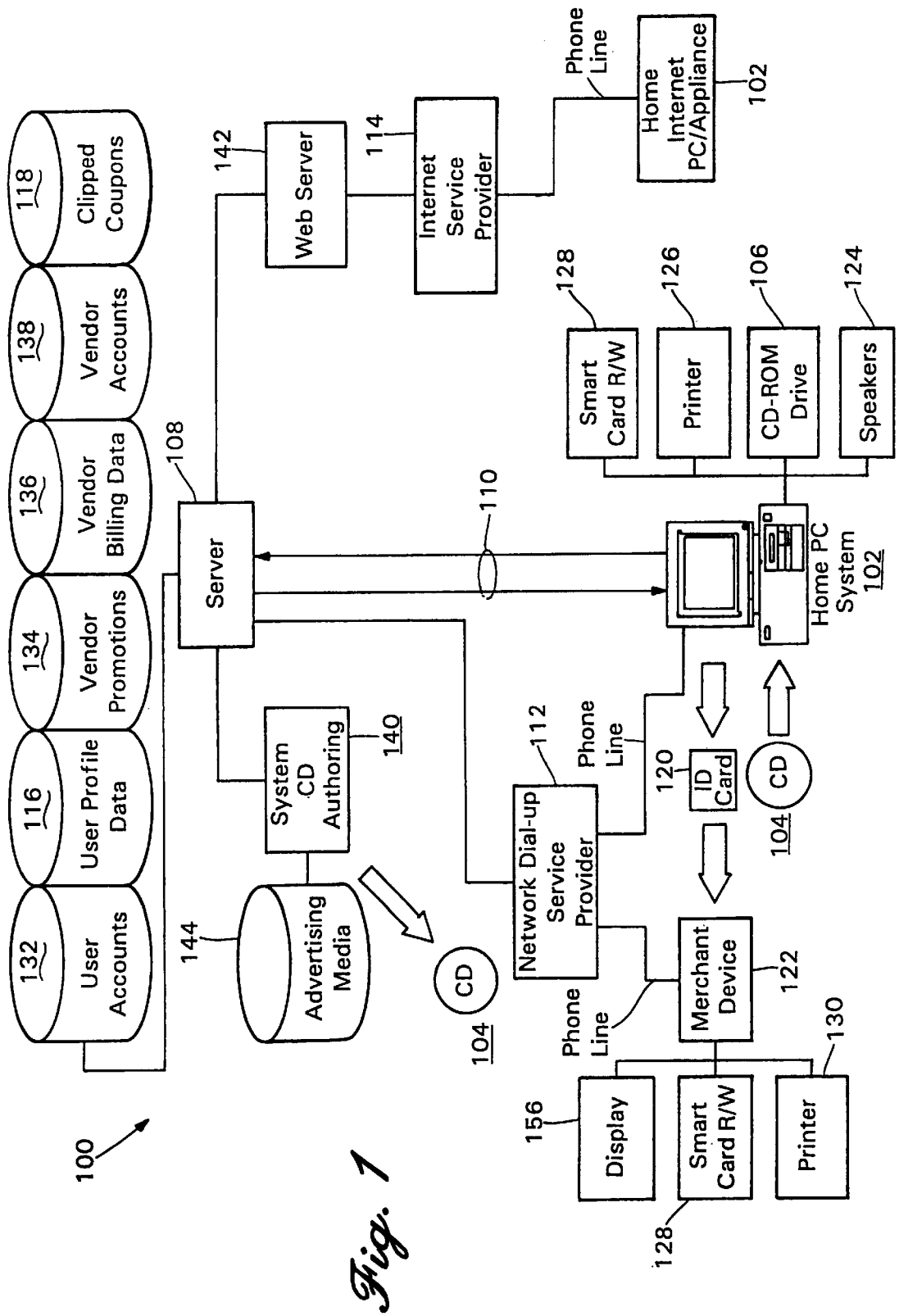
FIG. 1 is a schematic illustration of a system for accessing and displaying promotion information and for generating redeemable coupons therefrom in accordance with a preferred embodiment of the present invention.
Figure 4:
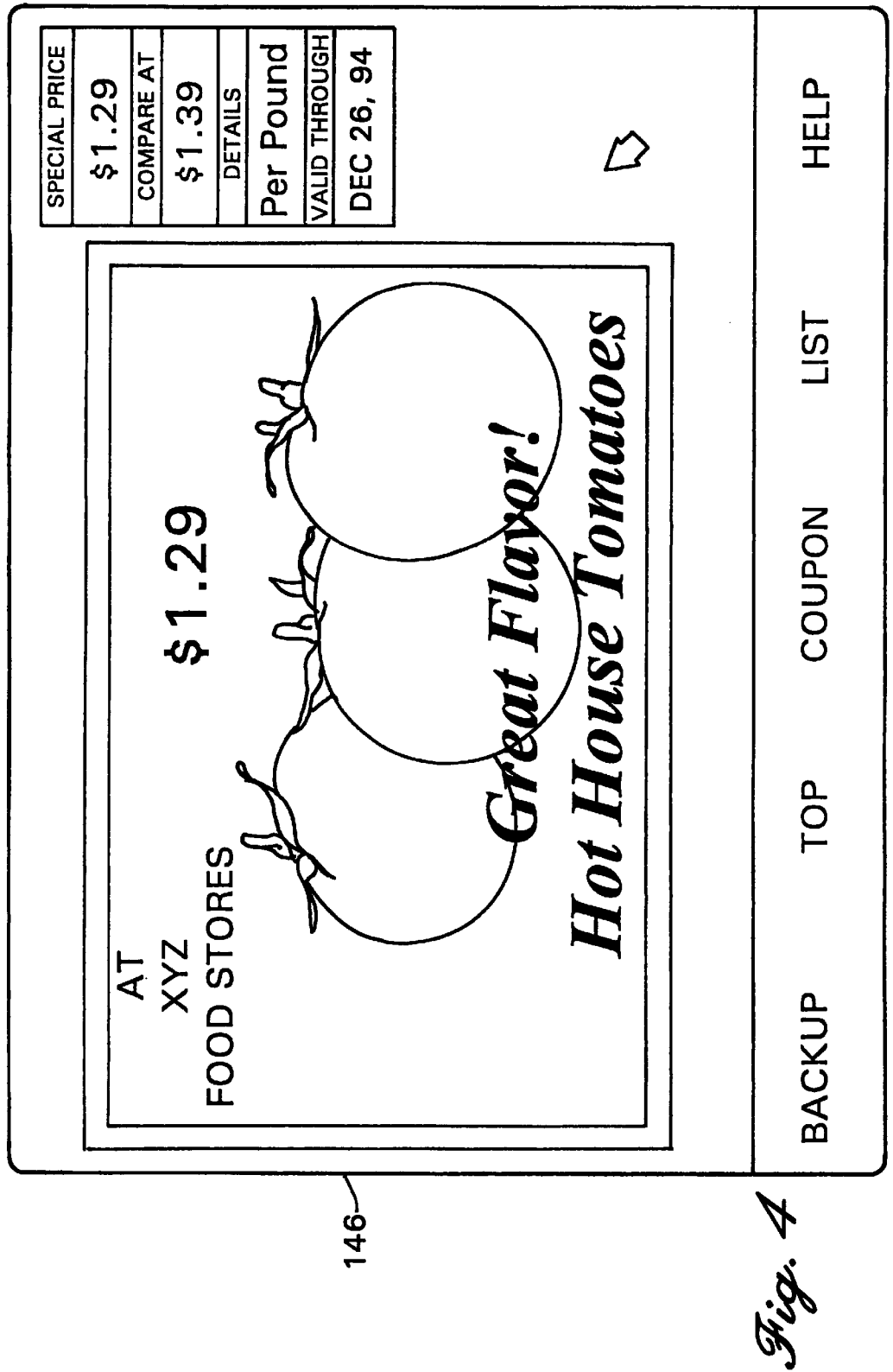
FIG. 4 is visual information from a promotion presented by the system of FIG. 1.

Referring to the drawings in detail, wherein like numerals are used to indicate like elements throughout, there is shown in FIG. 1 an interactive promotion system 100 for accessing and presenting promotions to a user at the user's remote location and for generating redeemable electronic coupons based on the promotions in accordance with a preferred embodiment of the present invention. The system 100 is a subscriber-based system that allows a user-subscriber to selectively choose from a plurality of promotions during a promotion browsing session with the aid of the user's own personal or other computer or PC appliance ("user PC") 102 at the user's remote location (i.e., the user's home, office, etc.), where the chosen promotions are presented on the user PC 102. Each promotion includes an offer from a vendor in connection with a product or service ("product/service") the vendor sells, leases, distributes, renders, or otherwise provides, and visual and/or audio information related to the product/service being promoted. An example of such visual information 146 is shown in FIG. 4. Each promotion may be ongoing or may be time sensitive, and may be a percentage discount, a dollar cost discount, a special price, location sensitive, etc. Each vendor may be a retail or wholesale store vendor, a manufacturing or outlet vendor, a service vendor, or the like.

Preferably, the information for each promotion is in the form of a promotion information record, where each promotion information record includes listings, specifications, prices, discounts and other information about a product/service ("detail information"). The promotion information for each promotion information record may be in the form of textual information, graphic information, video information, and/or audio information relating to the product/service being promoted.

Preferably, at least a portion of each of a plurality of the promotion information records are delivered to each user in the form of at least one CD-ROM disk 104 which is played on a CD-ROM drive 106 connected to or associated with the user PC 102. More preferably, the higher bandwidth information for each of the plurality of promotion information records, such as the graphic information, video information, and/or audio information, is stored on the CD-ROM disk 104, and the lower bandwidth information (including the detail information) is available only from a central server 108. Accordingly, it is preferable that the user be connected to the server 108 during each promotion browsing session. As should be understood, a promotion information record can likely be presented to the user more efficiently when the bulk of the information (the high bandwidth information) is on a CD-ROM disk 104 local to the user PC 102.

The CD-ROM disk 104 is preferably delivered to each user periodically (e.g., monthly, every six weeks), on a subscription basis. The promotion information on the CD-ROM disk 104 delivered to a particular user has only some general demographic relevance to that user. That is, the contents of the CD-ROM disk 104 are not highly individualized, and many people in a particular geographic area may receive identical CD-ROM disks 104. Accordingly, the CD-ROM disks 104 can be mass-produced.

Preferably, the lower bandwidth information (including the detail information) on the server 108 may be updated with update information as necessary before the user is provided with a new CD-ROM disk 104. For example, such update information may include a new purchase price for a product/service, or a new, different discount for a product/service, among other things. Also preferably, new promotion information records may be supplied as new information from the server 108 directly to the user before the user is provided with a new CD-ROM disk 104. As may be understood, such new information would likely not include the higher bandwidth information normally stored on the CD-ROM disk 104. Accordingly, changes to promotions and new promotions may be quickly effectuated.

As seen in FIG. 1, the server 108 may be connected to the user PC 102 either directly by a direct dial-up service 110, indirectly by a network dial-up (Intranet) service provider 112, through the Internet by an Internet service provider 114, or the like. If the Internet is employed, it is preferable that the system 100 include a web server 142 connected to or associated with the system server 108 to facilitate such Internet connection.

As should be understood, in an alternate embodiment of the present invention, the server 108 can provide the promotion information records directly to the user PC 102 during the session, and the CD-ROM disk 104 and CD-ROM drive 106 can be dispensed with. If a relatively large amount of information is to be downloaded from the server 108 during a session, it is preferable that only a portion of such information be initially provided, and that additional information be provided only if the user so requests. The portion of such information provided may be portions of each of several promotion information records, complete versions of selected promotion information records, or the like.

Preferably, the server 108 is one or more UNIX computers acting as servers. Preferably, the server 108 includes or is interfaced to an authoring system 140 to author the promotion information in a form that can be accessed by the user PC 102. As should be understood, the authored promotion information preferably resides on a vendor promotions database 134 connected to or associated with the server 108 and is employed to produce the CD-ROM disk 104. As seen in FIG. 1, the authoring system 140 has access to an advertising media database 144 for obtaining advertising media data necessary to author the promotion information.

Preferably, the user employs a "navigator" to browse the promotions based on user-defined search criteria. Also preferably, the promotions are presented to the user in a manner customized to that particular user's interests, in accordance with a user profile for that user. More specifically, the server 108 includes a user profile database 116 with user profile data for each user of the system 100. Based on the user profile for a particular user, that user is guided to but not limited in browsing the promotions.

Preferably, an initial user profile is generated by the server 108 based upon a questionnaire completed by the user upon first using the system 100, although it will be recognized that the questionnaire could be completed at other appropriate times and by other means without departing from the spirit and scope of the present invention. To complete the questionnaire, the server 108 prompts the user to provide basic information by which the presentation of promotion information can be tailored. For example, the user may be asked for information relating to the user's income, family, dates such as anniversaries and birthdays, special interests, product preferences, types of automobiles owned, and type of residence, among other things. With the user profile for each user, the server 108 may target certain promotions to certain users based on factors such as income, product preferences, geographic location, and the like.

Preferably, a user profile for a user not only guides the user in accessing promotions but is updated upon the user's accessing of promotions to reflect such accessions. Accordingly, the user profile for the user can change with the user and can adapt to new wants and needs that the user may have. For example, a user that accesses a number of promotions for a certain type of automobile may be presumed to be interested in purchasing such type of automobile, and the user profile for such user can be updated accordingly. Preferably, the user profile for the user is dynamically updated during each promotion browsing session in response to each user accession, as appropriate.

In an alternate embodiment of the present invention, the user is not continuously connected to the server 108 during each promotion browsing session. Instead, the session is based only on promotion information available on the CD-ROM disk 104 at the user PC 102. In such an alternate embodiment, the user profile for the user is preferably downloaded to the user from the user profile database 116 by way of the server 108 each time that user logs on to the system 100. Prior to the user logging off the system 100 or at some time after the session is completed, the updated user profile data for the user is uploaded to the user profile database 116 by way of the server 108.

In the preferred embodiment of the present invention, and again referring to FIG. 1, the server 108 also stores user account data, vendor billing data, and vendor account data in respective databases 132, 136, 138. Such databases allow the server 108 to add new users and vendors to the system, and to bill each vendor and user for use of the system. Preferably, the server is linked to individual vendor computers (not shown) for updating promotion information and the like.

As may be understood, the databases 116, 118, 132, 134, 136, 138 may be organized geographically or by other means. Further, more than one server 108 may be employed, where each server 108 preferably is dedicated to one area (geographic or otherwise). If servers 108 are geographically allocated, each server 108 preferably contains user information relative to users in the respective geographic region.

Figure 2:
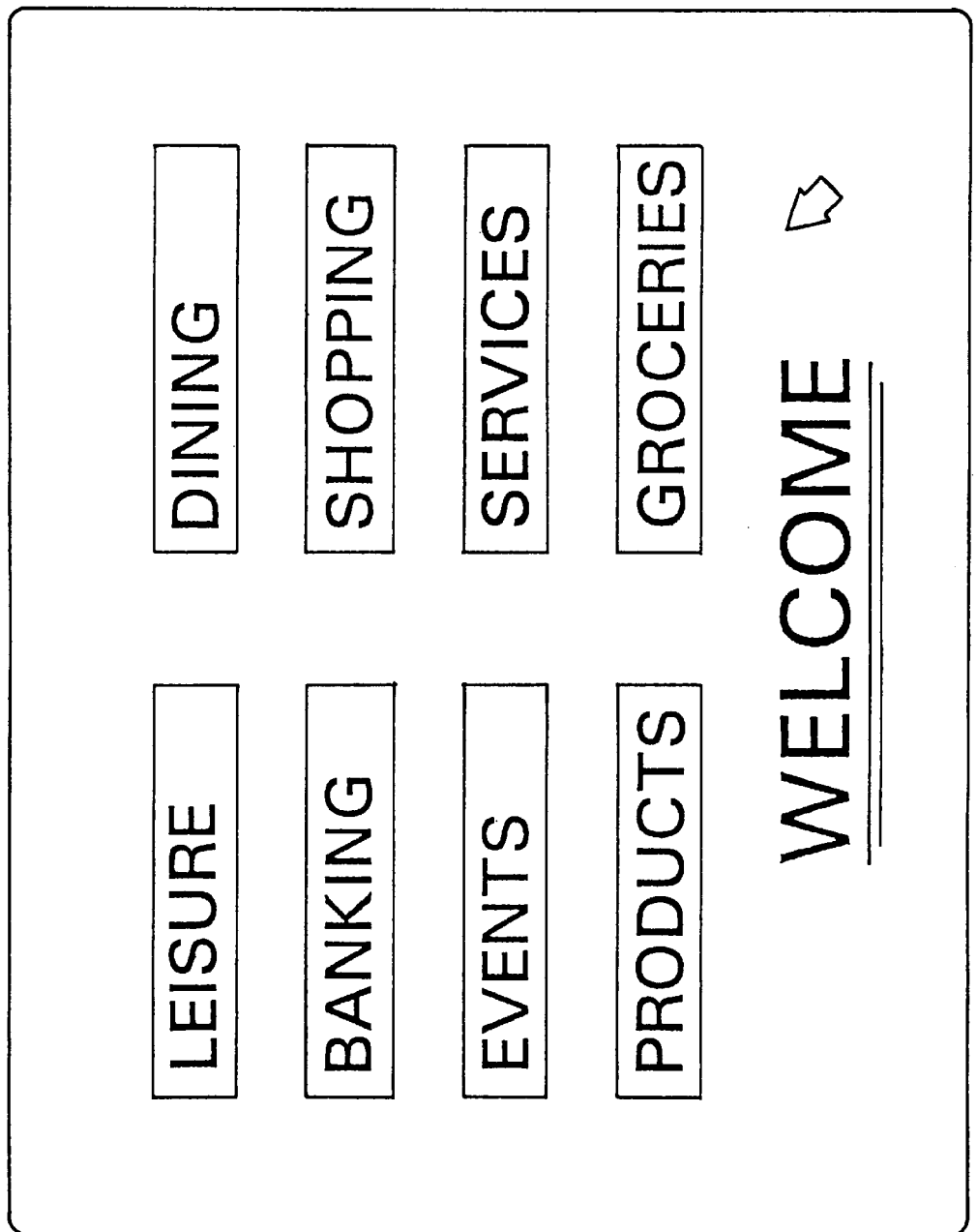
FIGS. 2 and 3, respectively, are a main menu and a sub-menu displayed by the system of FIG. 1.

Preferably, the promotion information records are presented to the user by way of a hierarchical structure of menus. For example, and as seen in FIG. 2, when the user first enters the system 100 (by, for example, powering up the user PC 102 and executing a local program on the user PC 102), a main menu 144M is displayed on the user PC 102. Additionally, a welcoming audio signal may be reproduced on speakers 124 associated with the user PC 102. The main menu may have a list of different areas of interest to the user (e.g., leisure, dining, shopping, events, services, products, groceries). The user has the option of selecting any item listed in the main menu 144M.

Figure 3:
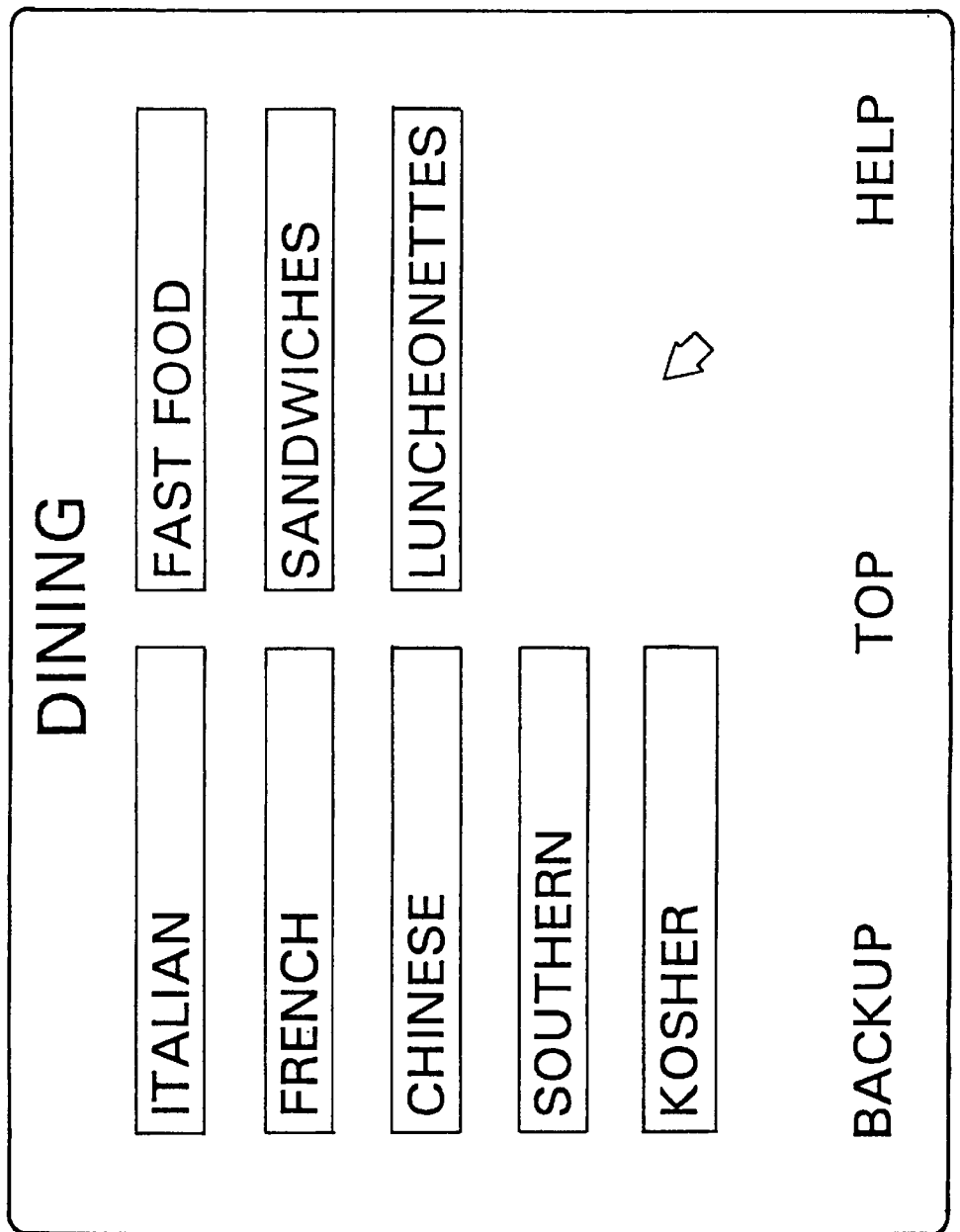

Typically, and as seen in FIG. 3, such selection would result in the display of one of several sub-menus 144S listing more specific choices from which the user could select. For example, a dining sub-menu 144S may list different types of restaurants (e.g. fast food, sandwich shops, luncheonettes, etc.) and/or different types of available food (e.g., Italian, French, Chinese, Southern, Kosher). As may be understood, the user works his or her way through the hierarchical structure of menus until he or she can actually view and/or listen to promotion information records for each of several available products/services. Preferably, and as seen in FIG. 3, each sub-menu 144S in the system contains options that the user may employ to navigate the hierarchical structure and to obtain answers to queries regarding the use of the system.

Preferably, in any sub-menu, the order of presentation of the choices that the user may select from is based on the user profile for the user. For example, if the user profile for the user indicates that the user usually chooses a first store and almost never chooses a second, similar store, the user profile for the user would require that the first store be listed or ordered before the second store if both stores appear in the same sub-menu.

Preferably, the system is dynamic and can create user-specific hierarchical branches based on the user profile for the user. For example, if the user frequently selects promotions from a particular store, those frequently selected promotions may be organized into a specific sub-menu under a sub-menu relating to the particular store.

In response to the user having chosen a specific promotion for presentation, and as seen in FIG. 4, visual information 146 from the promotion information record relating to the selected promotion is presented on the user PC 102. If the promotion information record relating to the selected promotion also contains audio information, such audio information is presented via the speakers 124 associated with the user PC 102.

Preferably, a user may selectively prevent the listing and presentation of certain specific types of promotions or groups of promotions. For example, if the user is a male, he may not care to be bothered with promotions for female-oriented products. Likewise, the user may not want to see promotions for certain adult-oriented products/services. Such repudiated types of promotions would then be appropriately noted in the user profile for the user.

Preferably, and still referring to FIG. 4, each displayed promotion contains a reward or "coupon" option. When the user wishes to take advantage of a promotion, the user selects the coupon option to mark or "clip" an electronic coupon for the promotion, and the "clipped coupon" is electronically stored in a clipped coupon database 118 connected to or associated with the server 108. Preferably, the clipped coupon database 118 is organized according to the user profiles in the user profile database 116. More preferably, the user profile database 116 includes the clipped coupon database 118 and the electronic clipped coupon offer is stored in the clipped coupon database 118 in connection with the user profile for the user.

Preferably, each displayed promotion also contains a "list" option that, when selected, adds the promoted product/service to a "shopping list". Such a shopping list may then be printed on a printer 126 connected to or associated with the user PC 102. The printer 126 may also be employed to print out promotion-related information including maps, addresses, telephone numbers, and the like.

When the user wishes to redeem one or more of the clipped coupons, the user need only visit a participating merchant. Preferably, each user is provided with a unique ID card 120 which is inserted into an ID card reader connected to a coupon-printing merchant device 122 at the participating merchant. Based on the unique ID card 120 for the user, the merchant device 122 communicates with the server 108 to access the list of clipped electronic coupons for the user. As shown in FIG. 1, such communication preferably occurs indirectly by the network dial-up (Intranet) service provider 112. However, one skilled in the art will appreciate that such communication may also occur directly by a direct dial-up service 110, through the Internet by an Internet service provider 114, or the like without departing from the spirit and scope of the present invention.

Figure 5:
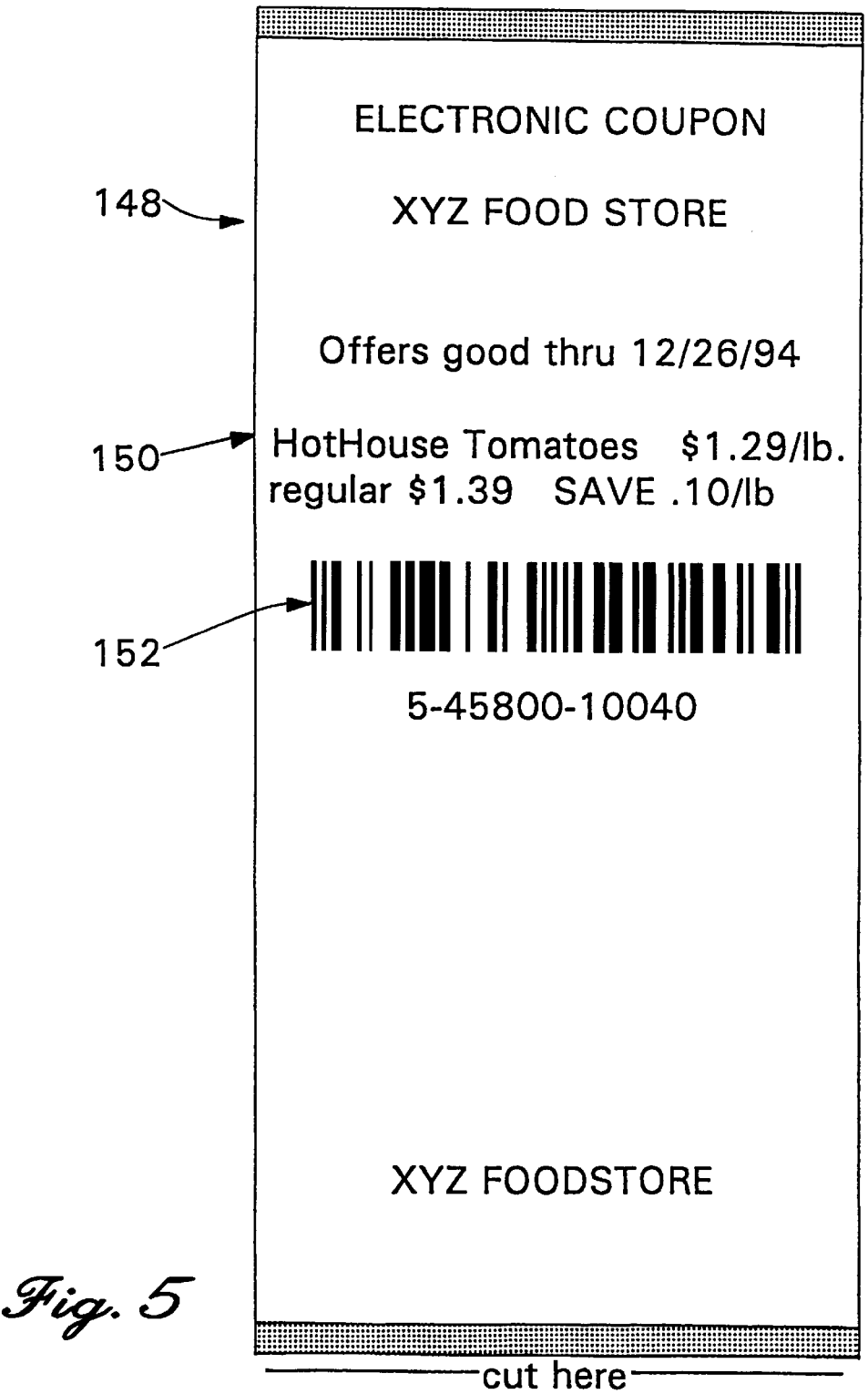
FIG. 5 is a coupon generated by the system of FIG. 1.

Once the merchant device 122 communicates with the server 108 to access the list of clipped electronic coupons for the user, the user may then view the clipped coupons by way of a display 156 connected to the merchant device 122, and select by way of the merchant device 122 one or more clipped coupons to be redeemed at the merchant. Preferably, a paper copy of each selected coupon is printed at a printer 130 connected to or associated with the merchant device 122 to maintain a paper trail. Preferably, and as seen in FIG. 5, each paper coupon 148 includes coupon terms 150 and optionally a bar code 152 that identifies the coupon to the retailer's point-of-sale equipment.

As one skilled in the art will recognize, the ID card 120 may be a credit card-like plate with a magnetic stripe and identifying information encoded on the magnetic stripe; an affinity credit card or debit card with a magnetic stripe and traditional credit card information and additional identifying information encoded on the magnetic stripe; or even an integrated circuit or smart card without departing from the spirit and scope of the present invention. In addition, the ID card 120 may include a bar code that identifies the user and that can be read by bar code scanning equipment.

As should be understood, a smart card is a credit card-like plate with memory and processor capabilities, and may in fact be a conventional credit card or the like that includes such smart card capabilities. If the ID card 120 is a smart card, the user may optionally employ a smart card reader/writer 128 to store the clipped electronic coupons in an appropriately configured clipped coupon database 118 on the smart card 120. Of course, a similar smart card reader/writer 128 would have to be connected to the merchant device 122 to allow the merchant device 122 to read the clipped electronic coupons from the database 118 on the smart card 120 and print the paper coupons 148.

When a paper coupon 148 is printed at the printer 130 connected to or associated with the merchant device 122, it is preferable that the merchant device 122 communicate to the server 108 user information on the user that printed the coupon and product/service information on the product/service to which the coupon relates. Accordingly, the user profile for the user on the server 108 is updated in response to the provided user information and product/service information. Additionally, the user profile for the user may be updated with any bonuses that may be available for redeeming a particular coupon. For example, the user may be provided with bonus points that are redeemable for prizes, may be credited a dollar amount as against a user fee, and/or the like. Alternatively, if the user is provided with a smart card 120, the merchant device may be programmed to encode the bonus points and/or credits onto such smart card 120.

Preferably, each merchant is charged a fee for each paper coupon 148 the merchant redeems. If the user ID 120 is a credit card or debit card, it is preferable that the credit card 120 be employed to pay the merchant in connection with the transaction whereby the coupon 148 is redeemed, and that the fee be collected as part of the credit card charge reconciliation. As is well known, such reconciliation is performed by a reconciliation provider which also charges a fee for its services. Preferably, the reconciliation provider also posts any rewards or credits due to the user based on the redemption.

As one skilled in the art will recognize, the merchant device 122 may be any of several well known sales communications devices available to merchants without departing from the spirit and scope of the present invention. For example, the merchant device 122 may be a variation on the ubiquitous credit card authorization and approval device found at most merchants. Of course, such credit card device may require upgrading to support the use of the printer 130, smart card reader/writer 128 and/or the display 156, and to support the communications with the server 108.

Preferably, the user may update his or her own user profile as necessary. For example, the user may request a specific type of promotion and/or indicate that he or she wishes to be presented with promotions from a specific geographic area. If the server 108 determines from the updated profile that appropriate promotion information records are not stored on the CD-ROM disk 104 local to the user, then the user can direct the server 108 to undertake an extended search, including interfacing with other central servers 108, perhaps those in other geographic areas.

Preferably, at appropriate times in relation to events noted in the user profile for the user (e.g., an anniversary, a birthday) the central server 108 causes the user to be guided to product/service information pertaining to the occasion. For example, the user may be guided to promotions regarding an anniversary gift several days before an anniversary.

As one skilled in the art will appreciate, the software necessary to operate the user PC 102, the server 108, the merchant device 122, and the other elements of the system 100 is not complex or unusual. In fact, significant parts of such software may be obtained off-the-shelf. For example, the communications between the elements may be accomplished by way of any of several well known communications software systems, while the database operations performed by the server 108 may be performed by any of several well known database software systems. Accordingly, the methods and steps performed by such software should be apparent to one having ordinary skill in the art, and no flow diagrams or the like are believed necessary or are included as part of the present disclosure.

The system 100 as was described above is used as follows. Typically, the user begins a promotion browsing session on the system 100 by starting an appropriate local application on the user PC 102. Preferably, the start time is logged as use information in the user profile for the user. Once the local application is started, communication is established between the user PC 102 and the server 108.

Thereafter, the user navigates through a series of menus and sub-menus 144M, 144S to search for products/services of interest. The user may navigate based on a particular product from any vendor, based upon promotions offered by a particular vendor, and/or based on system suggestions derived from the user profile for the user or in response to extended search queries from the user. Information pertaining to the user's navigation of the menus and sub-menus 144M, 144S is dynamically stored in the user profile for the user as the session proceeds.

If the user is interested in a particular promotion, the user can clip an electronic coupon in connection with the promotion of interest, and the server 108 will appropriately note that such a coupon was clipped. Preferably, and as was described above, the server 108 stores the electronic clipped coupon information in the clipped coupon database 118 in connection with the user profile for the user.

After the session has ended, to redeem a clipped coupon, the user must visit a participating retailer having a merchant device 122. At the retailer, the user logs into the merchant device 122 by way of the user ID card 120 to establish the identity of the user to the merchant device 122. A list of electronic coupons clipped by the user and redeemable by the retailer are then presented to the user on the display 156 connected to the merchant device 122. The user may then select one or more of the clipped coupons to be printed as paper coupons 148 on the printer 130 connected to the merchant device 122. The paper coupons 148 may then be redeemed at the retailer in the usual manner that traditional coupons are redeemed.

As was discussed above, when a paper coupon 148 is printed for a user, it is preferable that the server 108 be provided with information consistent therewith and that the user profile for the user in the user profile database 116 be updated by the server 108 in response to the provided information. As may be understood, such information can provide valuable demographic information on the user, the types of products the user is interested in, etc.

As should now be appreciated, with the system 100 of the preferred embodiment of the present invention, a user may quickly access and peruse promotions or offers that are likely to be of interest to that user. Further, with the system 100 and the electronic clipped coupons generated therefrom, the user need not physically save, organize, and carry coupons from merchant to merchant. Perhaps most importantly, the system 100 of the preferred embodiment of the present invention does not require that the user have additional equipment beyond that which is likely already available to the user, i.e., a PC 102 properly configured.

From the foregoing description, it can be seen that the present invention comprises a new and useful system for accessing promotion information and for generating redeemable coupons therefrom. It will be appreciated by those skilled in the art that changes can be made to the embodiment described above without departing from the broad inventive concepts thereof. It is understood, therefore, that this invention is not limited to the particular embodiment disclosed but is intended to cover modifications within the spirit and scope of the present invention as defined by the appended claims.

What is claimed is:

1. A system for accessing promotion information and for generating redeemable coupons therefrom, the system comprising:

promotion information record storing means for storing a plurality of promotion information records, each promotion information record including an electronic coupon offer in connection with a product/service offered for sale by a merchant and information relating to the product/service being promoted, user profile storing means for storing a user profile for a system user, the user profile including user preference information based on preferences of the user, the user having a unique system identifier;

presentation means for presenting the stored promotion information records to the system user according to a hierarchical menu structure, the hierarchical menu structure including a main menu and a plurality of hierarchically linked sub-menus, each sub-menu including a plurality of choices, where the user navigates the hierarchical menu structure to select promotion information records for presentation;

repudiation means for allowing the user to selectively prevent the presentation means from presenting predefined types of stored promotion information records to the user;

electronic coupon clipping means for allowing the user to electronically clip the coupon offer of a presented promotion information record, the electronic clipped coupon offer being stored in an electronic clipped coupon database in connection with the user profile for the user; and paper coupon generating means located at a merchant including means for entering the unique system identifier of the user, means for accessing the electronic clipped coupon offer from the electronic clipped coupon database, means for allowing the user to review the electronic clipped coupon offer, and means for generating for the user a paper coupon corresponding to the electronic clipped coupon offer, the paper coupon being redeemable by the merchant.

2. A method of operating a computer system for accessing and redeeming coupons, said method comprising the steps of:

displaying coupon information on a consumer computer;

enabling the selection on said consumer computer of a specified coupon associated with said coupon information;

transmitting an electronic version of said specified coupon from said consumer computer to a central computer;

electronically invoking said specified coupon at said central computer in response to a transaction at a merchant location;

logging, through a reconciliation provider, a system fee to a merchant in connection with said transaction; and crediting, through said reconciliation provider, a consumer for an amount associated with said specified coupon in response to said transaction.

3. The method of claim 2 further comprising identifying a unique ID card associated with said consumer.

4. The method of claim 3 further comprising identifying a credit card associated with said consumer.

5. The method of claim 4 wherein said logging step includes the step of logging said system fee to said merchant when said transaction is reconciled with said credit card.

6. The method of claim 4 wherein said crediting step includes the step of crediting said consumer when said transaction is reconciled with said credit card.

7. The method of claim 3 further comprising identifying a debit card associated with said consumer.

* * * * *